(12) United States Patent
Lu et al.

(10) Patent No.: US 8,527,757 B2
(45) Date of Patent: Sep. 3, 2013

(54) METHOD OF PREVENTING WEB BROWSER EXTENSIONS FROM HIJACKING USER INFORMATION

(75) Inventors: HongQian Karen Lu, Austin, TX (US); Asad Mahboob Ali, Austin, TX (US); Kapil Sachdeva, Leander, TX (US)

(73) Assignee: Gemalto SA, Meudon (FR)

( * ) Notice: Subject to any disclaimer, the term of this patent is extended or adjusted under 35 U.S.C. 154(b) by 632 days.

(21) Appl. No.: 12/666,276

(22) PCT Filed: Jun. 23, 2008

(86) PCT No.: PCT/IB2008/001637
§ 371 (c)(1),
(2), (4) Date: May 21, 2010

(87) PCT Pub. No.: WO2009/001197
PCT Pub. Date: Dec. 31, 2008

(65) Prior Publication Data
US 2010/0235637 A1    Sep. 16, 2010

Related U.S. Application Data

(60) Provisional application No. 60/945,830, filed on Jun. 22, 2007.

(51) Int. Cl.
*H04L 29/06* (2006.01)

(52) U.S. Cl.
USPC .................................. 713/168; 726/9; 726/22

(58) Field of Classification Search
USPC ....................................................... 713/168
See application file for complete search history.

(56) References Cited

U.S. PATENT DOCUMENTS 6,327,578 B1 * 12/2001 Linehan ......................... 705/65
6,738,901 B1 *  5/2004 Boyles et al. ................. 713/159

(Continued)

FOREIGN PATENT DOCUMENTS

WO    2006/131897 A1    12/2006

OTHER PUBLICATIONS van Thanh, Do; Jonvik, Tore; van Thuan, Do; Jorstad, Ivar. Enhancing Internet Service Security Using GSM SIM Authentication. Globecom '06. Pub. Date: 2006. Relevant pp. 1-5. Found on the World Wide Web at: http://ieeexplore.ieee.org/stamp/stamp.jsp?tp=&arnumber=4150865.*

(Continued)

*Primary Examiner* — Nathan Flynn
*Assistant Examiner* — Jeremiah Avery
(74) *Attorney, Agent, or Firm* — The Jansson Firm; Pehr B. Jansson

(57) ABSTRACT

The invention relates to a portable authentication token comprising connection means for connecting to a computer, browser communication means for communicating with a browser running on the computer, and user authentication means for authenticating a user of the token to a server. The user authentication means are triggered via the browser communication means when the user connects to the server from the browser of the computer. The user authentication means are set to authenticate the user by communicating with the server through the browser. The token comprises out-of-band token communication means set to validate user authentication by establishing a communication channel between the token and the server, the communication channel bypassing the browser.
The invention also relates to an authentication method and to a system comprising a token, a computer and a server to which the user authenticates with the token.

32 Claims, 4 Drawing Sheets

(56) References Cited

U.S. PATENT DOCUMENTS

Figure 1:
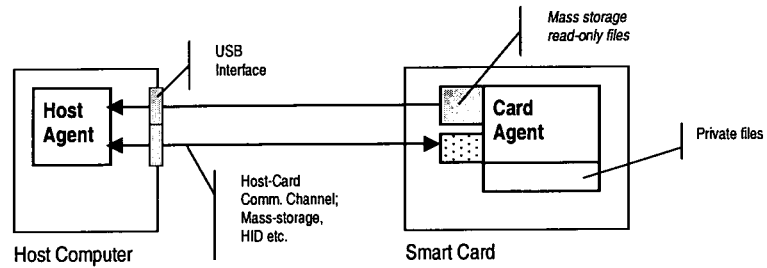

| | | | |
|---|---|---|---|
| 6,957,199 B1 * | 10/2005 | Fisher | 705/78 |
| 7,363,363 B2 * | 4/2008 | Dal Canto et al. | 709/223 |
| 7,565,536 B2 * | 7/2009 | Vassilev et al. | 713/168 |
| 7,725,562 B2 * | 5/2010 | Blakley et al. | 709/219 |
| 7,730,527 B2 * | 6/2010 | Charles et al. | 726/11 |
| 7,941,669 B2 * | 5/2011 | Foley et al. | 713/182 |
| 8,132,243 B2 * | 3/2012 | Bychkov | 726/9 |
| 2004/0002878 A1 * | 1/2004 | Maria Hinton | 705/7 |
| 2005/0071282 A1 | 3/2005 | Lu | |
| 2006/0020783 A1 * | 1/2006 | Fisher | 713/156 |
| 2006/0294023 A1 | 12/2006 | Lu | |
| 2008/0046984 A1 * | 2/2008 | Bohmer et al. | 726/5 |

OTHER PUBLICATIONS

Urien, P : "Internet card, a smart card as a true Internet node" Computer Communications, Elsevier Science Publishers BV, Amsterdam, NL, vol. 23, No. 17, Nov. 1, 2000, pp. 1655-1666, XP004238469 ISSN: 0140-3664. The whole document.

* cited by examiner

METHOD OF PREVENTING WEB BROWSER EXTENSIONS FROM HIJACKING USER INFORMATION

The invention relates to portable authentication tokens, systems comprising tokens, computers and servers, and methods for authenticating a user to a server with a token.

In recent years the Internet and its usage have been rapidly expanding. Unfortunately online identity thefts and frauds are on the rise as well. Adversaries have found many different ways to steal online identities. Various spywares invade computers without users' knowledge through email attachments or via a web page visited by the user. The attack techniques are becoming so sophisticated that even the tech-savvy users can become victims of online identity theft. To protect consumers and service providers, many software and hardware solutions have been proposed or developed. These methods in general enhance online authentications, but they implicitly assume that the web browser, the most prevalent tool for online activities, is secure. Unfortunately a malicious Browser Helper Object (BHO), or in general a malicious browser extension, can break this assumption readily. Certain malicious BHOs can monitor or parse information passing through the browser, and steal or change such information. For example, some BHO could capture the username/password embedded in a web login form, or change the destination URL to a malicious one.

On personal computers running the Microsoft Windows operating systems, BHOs typically consist of a DLL which needs to be registered in the windows registry. In order to be installed on a computer, BHOs typically require administrative privilege on this computer. Therefore a hacker is not necessarily able to install it. But if the BHO masquerades as a legitimate tool, such as a popup blocker tool, the user may download it and install it himself, while in reality it is a rogue tool. Unfortunately, many BHOs are security tools and the user may be inclined to trust them. For example, There are various web browser extensions that help users to manage their passwords or to detect spoofed sites. Examples include PwdHash and PassPet. PwdHash is described in Ross, B., Jackson, C., Miyake, N., Boneh, D. and Mitchell, J. C., "Stronger Password Authentication Using Browser Extensions," USENIX Security Symposium 2005, http://crypto*stanford*edu/PwdHash/pwdhash*pdf (where "*" should be replaced with "." to provide a functioning hyperlink). PwdHash captures the user input to the password field, computes a hash value from the user password and the site domain name, and sends the hash value instead of the password. PathPet is described in Yee, K. and Sitaker, K, http://passpet.org/. PassPet generates a user password from user's master address, master secret, and site label, and fills in the password automatically when the user logs in to the site. It generates a different password for each site and the user does not need to know or remember them. However the automatically generated password or password hash is still in the web login form in the browser, and can be accessed by another, malicious, BHO.

Different techniques have been devised to secure the authentication of a user to a server, however such techniques are prone to attack by rogue BHOs.

On known technique consists of smart cards, which have been used to provide two factor authentications for Internet applications. The smart card may store the user's login credentials inside the card. Such cards may use middleware running on the PC to first authenticate a user through his PIN, and then get his account credentials for a selected site. The username and password may be automatically inserted into a form, which is then submitted to the remote server. One example is ID Vault from GuardID Systems, http://www-.guardidsystems.com. The ID Vault requires client software and browser plug-ins installed on the user's computer. This kind of form filling method thwarts keystroke loggers, enables the user to create strong passwords, and is convenient to use. A smart card-based token is typically more secure than other flash memory based tokens due to the inherent security of smart card chips. However, the form filling approach itself leaves the login information in an unencrypted form in the web browser before being sent. The attacker may hack the browser via a malicious BHO and steal the information. The method is also vulnerable to Phishing and Pharming attacks.

Biometrics has also been used for user authentications. It brings in the third factor: who you are. One popular product is Microsoft's fingerprint reader with password saver described in "Microsoft Fingerprint Reader", http://www.microsoft-.com/hardware/mouseandkeyboard/features/fingerprint.m-spx. The user registers his usernames and passwords by entering them to his computer and swiping his finger through the fingerprint reader. The login credentials are stored on the user's computer. To login, the user selects the website and wipes his finger through the reader. The client software automatically fills up the login web form. From the security perspective, it is as vulnerable as other form fill methods, giving malicious BHOs opportunities to steal the information.

Another known technique is based on a portable authentication token known as the Network Identity Module (NIM).

A known Network Identity Manager (NIM) consists of a smart card-based USB token. It provides a strong two-factor mutual authentication solution, which enables a user to login to remote servers. A NIM has a local agent (called card agent when the NIM is a smart card) and a host agent, as explained in particular in A. Ali, K. Lu, A. Vassilev and E. Dolph, "A Method of Using Smart Card Devices without Requiring Smart Card Infrastructure", U.S. Pat. No. 788,400. Both agents reside on the smart card. The host agent runs on the host computer (for example, it may be visible on the PC through a mass storage interface which make the host agent appear to the PC just like an executable file on a CD ROM) while the card agent runs inside the card.

For desktop applications, NIM is typically a USB token. The user plugs his NIM token into a USB port of a PC in order to use it.

In the NIM, the host agent typically comprises a web server, NIM applications, and a web agent. The NIM web server may be accessible through an URL such as https://localhost:4116, which enables the user to access NIM and its services through a standard web browser on his PC. NIM applications provide services such as token registration, PIN management, and user authentication to remote websites. The web agent may connect to remote websites as a client to authenticate the sites' legitimacy.

The NIM typically stores confidential data of its holder—such as private keys and user login credentials—in its internal secure file system. The card agent runs inside the smart card and can access these private data. It also provides cryptographic functionalities related to the data. The card agent provides services to the host agent, for example, to validate the user PIN and to provide encrypted user login credential.

For secure login to a remote server, the NIM typically encrypts the user's login credential and some other information using the remote server's public key and signs the credential and the information using the NIM private key. The NIM may then send the resulting data blob to the remote server through the web browser, with which the user interacts.

There are alternatives to the NIM, to which the invention applies as well, in particular TCP/IP smart cards that only have card software and do not rely on host software running on PC, or traditional smart cards that have embedded card software and rely on middleware (some sort of host agent) stored on the PC and running on PC.

One problem with state of the art solution is therefore that they are extremely sensitive to attacks by rogue BHOs. For example, after a user enters his login credential (e.g. username and password) to the browser by typing in, via a hardware token, via a browser extension, or some other software, the browser sends the credential to the remote server. The server validates the credential and returns back a post-login page. However, if there is a malicious. BHO in the browser, the BHO can intercept the user credential and send it to the attacker. The attacker now gets the user credential and can use it at least once or repeatedly.

It is therefore an object of the invention to propose a token, a method and a system which make BHO attacks more difficult to carry out. The token according to claim 1, the method according to claim 15 and the system according to claim 34 solve this problem.

The invention is advantageous, because for many malicious BHO, the "Post login page" comes back only to the original browser, and not to a client under the "Attacker" control.

Figure 2:
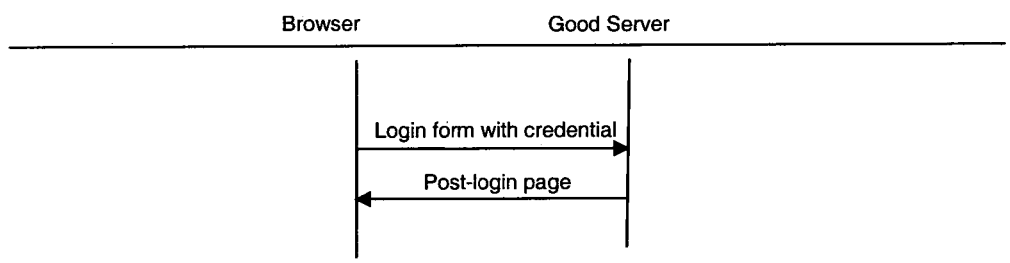
Figure 3:
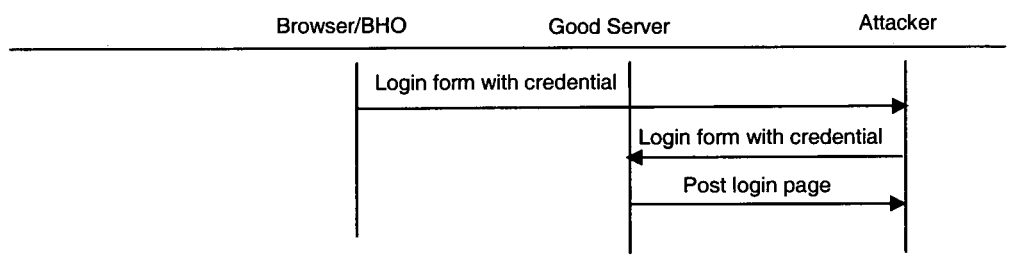
Figure 4:
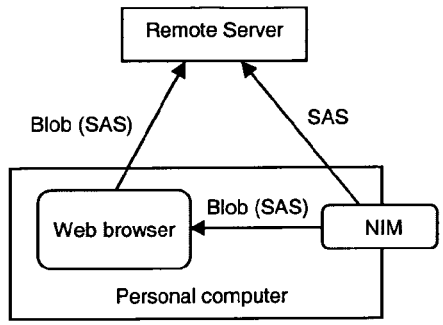
Figure 5:
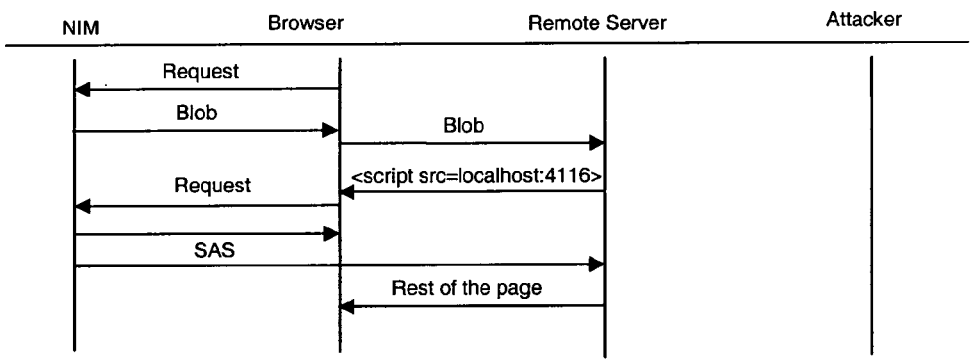
Figure 6:
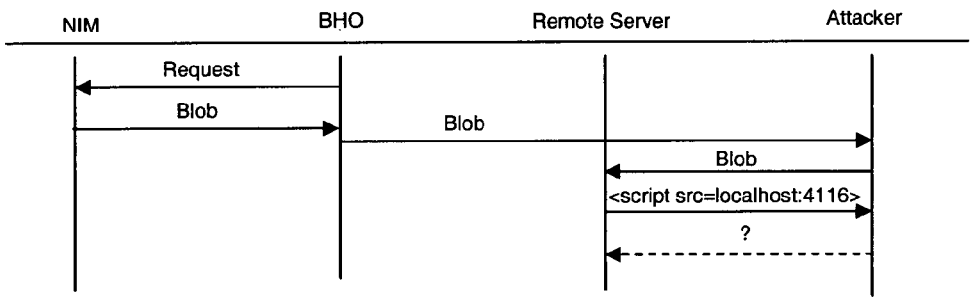
Figure 7:
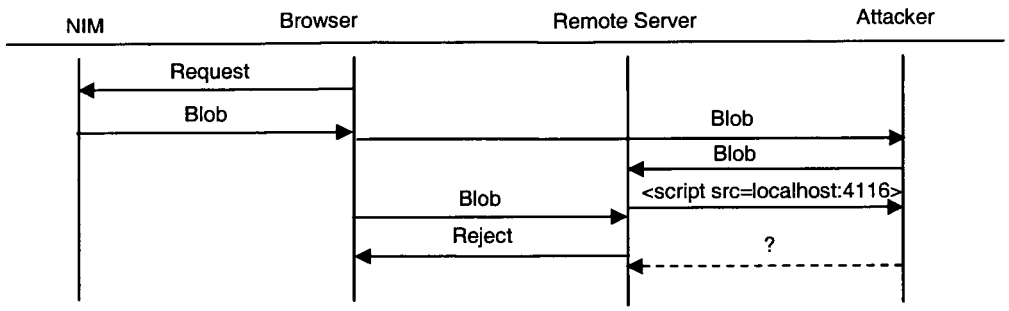
Figure 8:
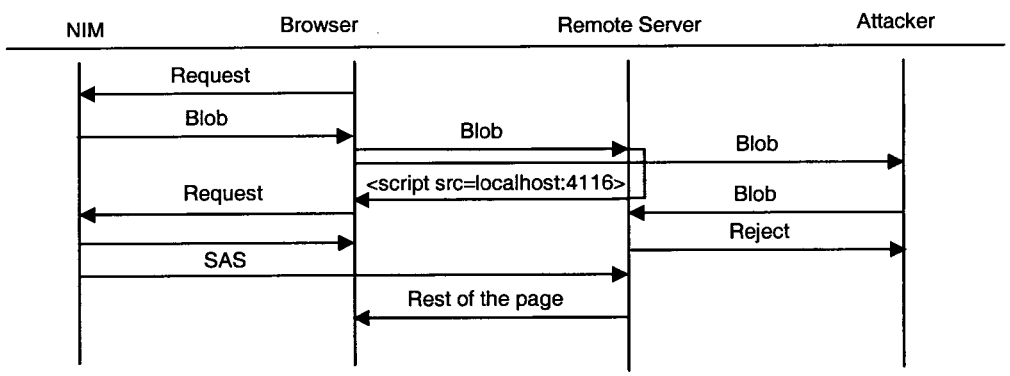
Figure 9:
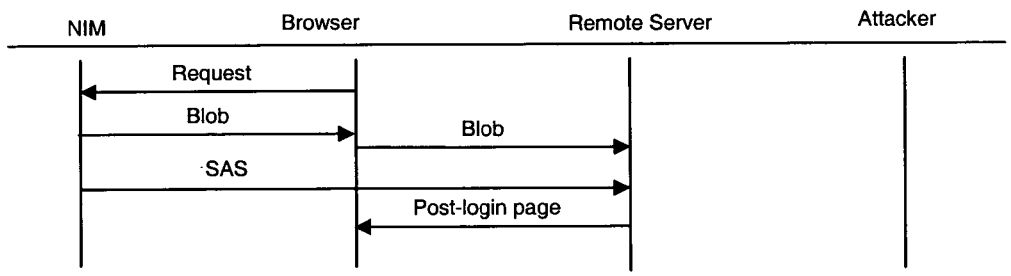
Figure 10:
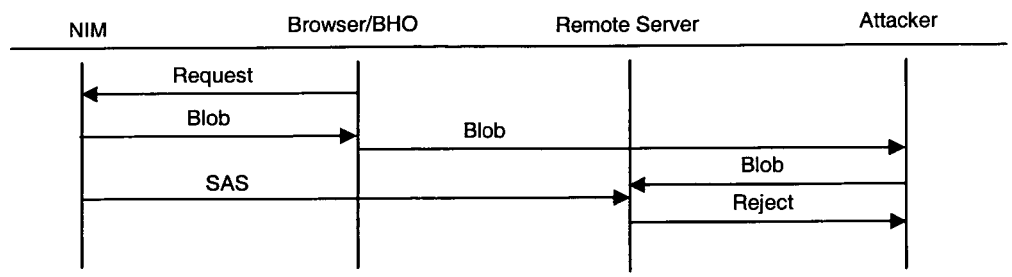

The invention and its advantages will be explained more in details in the following specification referring to the appended drawings, in which:

FIG. 1 represents a High level architecture of Network Access Card which is a type of NIM, FIG. 2 represents an ideal login case in state of the art systems, that is a login which is not subject to an attack by a rogue BHO, FIG. 3 represents how a BHO can intercept the login credential and sends them to an attacker with state of the art systems, FIG. 4 is an overview of the out-of-band communication, FIG. 5 represents a normal remote server login operation using the NIM in an embodiment of the invention, FIG. 6 represents one type of failed attack against the system according to the invention, based in rogue BHO, wherein the BHO intercepts the data blob from the browser, FIG. 7 represents a first variant of a second type of failed attack against the system according to the invention, based in rogue BHO, wherein the blob intercepted and sent by the attacker arrives first, FIG. 8 represents a second variant of the second type of failed attack against the system according to the invention, based in rogue BHO, wherein the blob from the browser arrives first, FIG. 9 shows a remote server login operation of an alternative embodiment of this invention, FIG. 10 depicts a failed attack against the alternative embodiment wherein the attacker's request is rejected because the blob and SAS were sent from different nodes.

In preferred embodiments, the authentication method provides secure online authentication by combining the credential protection method of Network Identity Manager (NIM) and a synchronized out-of-band communication to make it more difficult for malicious browser extensions to steal user information. The invention thwarts many online identity theft schemes, in particular currently existing malicious browser extension, keylogger, Trojan horse, Phishing, Pharming, password guessing, man-in-the-middle, eavesdropping, and replay attacks.

For the convenience of the following descriptions, we assume a malicious browser extension is a Browser Helper Object (BHO). But the method applies to other browser extensions as well. NIM is used as an example. However, this method is not limited to the use of NIM.

Preferred embodiments of the invention combine the NIM's credential protection method with an out-of-band communication to prevent malicious BHOs from stealing user information. The "out-of-band communication" generally refers to communication which bypasses the browser, since what happens in the browser is in general the easiest target for BHO attacks. Out-of-band communications are therefore outside the previously established communication method or channel. In the context invention, the user authentication is carried out through the browser, and the previously established communication channel is in particular between a web browser and a remote server. In preferred embodiments a direct end-to-end secure communication between NIM and the remote server is the "out-of-band" communication, and it does not flow through the web browser.

The user typically interacts with his NIM token modified according to a preferred embodiment of the invention using a standard web browser on his computer. When the user wants to login to a remote server using NIM, the web browser sends a request to NIM. The NIM web server preferably generates a data blob using the user's login credential, an OTP value or some other counter or timestamp, and association data such as a shared association secret (SAS). The login credential may be username and password, or some other login information. The OTP, a counter, or a timestamp can prevent replay attack. The SAS is preferably randomly generated each time. The data blob may be generated by encrypting the data using the remote server's public key and signing the data using NIM's private key. The NIM token's certificate (which may be attached for easier retrieval by the server) lets the server validate the token signature.

The plaintext of the data blob may be:
{username+password+tokenID+OTP+SAS}
The resulting Blob may then be represented as follows:
{RSAencrypt(plaintext)remote_server_pub_key +RSAsign (plaintext)Token_priv_key+Token_Certificate}

The NIM web server sends back a response containing the login data blob to the browser. With (or without) a user interaction (mouse click), the browser redirects the data blob to the remote server. The remote server decrypts and validates the data blob. It also validates the user's login credential. To make it more difficult for a rogue BHO to simulate that the data blob is sent from a computer to which the NIM is connected while it's not, the remote server preferably expects an out-of-band SAS. The NIM web server preferably establishes a secure SSL/TLS channel directly with the remote server and sends the SAS as illustrated in FIG. 4. This is an out-of-band communication, which is outside of the normal communication channel between the web browser and the remote server.

If the remote server finds that the SAS from a NIM token matches the one in a data blob, it grants the user login and returns a post-login page to the web browser. The remote server may, in addition, check if the SAS from a NIM and the corresponding data blob from a web browser are from the same network address. If these network addresses do not match the login request may be rejected (in some instances, matching addresses is not desirable, as will be seen below). All communications among NIM, the browser and the remote server are preferably secured using SSL/TLS.

Through a malicious BHO, the attacker might get the login data blob, but he cannot get the user's login credential from the blob if the plaintext was encrypted using the remote server's public key. It is harder for the attacker to do a replay attack because he does not know the SAS.

FIG. 1 is a presentation of a high-level architecture of a Network Access Card which is of type NIM. The Network Access Card contains a local agent (also known as a card agent) and a host agent. As noted above, the host agent executes on the host computer whereas the card agent executes on the Network Access Card. Together, the host agent and local agent provide for communication with a browser running on the host computer. The host agent includes a web server, referred to herein as the NIM web server. As noted above, the card agent provides services to the host agent, for example, to validate the user PIN and to provide encrypted user login credentials.

The aforementioned out-of-band communication may be established between the token and the server as a connection between the local agent and the host agent and as a TCP/IP connection between the host agent and the remote server. The communications between the token and the server may use an IPSEC, SSL, or TLS protocol.

FIG. 5 illustrates the sequence of operations for remote server login operation according to a preferred embodiment of this invention. When the user wants to login to the remote server using NIM, the web browser sends a request to the NIM web server. The NIM server responds with a login blob as described earlier. The browser redirects the blob to the remote server.

In order to make it more difficult for a hacker to have the data blob sent from a browser of his choice, the remote server sends a partial response containing a JavaScript code to the browser of the user. This code loads a resource from the localhost:4116, which is the preferred URL of the NIM web server. When the partial response reaches the browser, the JavaScript interpreter sends a request to the NIM web server. The NIM server responds to the browser with an "empty" response. At the same time, NIM connects to the remote server directly via TLS connection and sends the same SAS as that in the data blob to the remote server. This is a direct connection between NIM and the remote server without going through the browser. A malicious BHO in the browser would have difficulties to intercept this out-of-band communication, and cannot extract the contents of this out-of-band connection anyway. After the remote server receives the SAS, it finds the data blob with the same SAS. If the matching is successful and the remote server has validated the user's login credential, the server sends the rest of the post-login web page to the browser.

Some web browsers, although unlikely, may have JavaScript disabled. In this case, the remote server's partial response can use the Image tag or other means of HTML to get a resource from localhost:4116 or whatever the URL of the NIM is. The remote server can detect if the client's JavaScript is enabled through various known mechanisms. For the partial response page, using JavaScript is advantageous because it can provide a richer and more intuitive user experience.

Examples of attacks that are defeated by the invention are given below. Assume that there is a malicious BHO in the user's web browser. When NIM sends the login data blob to the browser, the BHO may redirects the blob to the attacker. The latter sends the blob to the remote server. If the remote server had not adopted the out-of-band method presented in this section, it would grant the login request as illustrated in FIG. 3. With this invention, the remote server expects an out-of-band SAS sent directly from a NIM token. After receiving the data blob, the remote server sends a partial response requesting the NIM web server to send SAS. The attacker does not know the SAS and it is hard for him to devise an attack for sending back the correct SAS. Hence, the remote server wouldn't grant the login request (See FIG. 6).

Alternatively, the malicious BHO may let the login data blob be redirected by the browser to the remote server. The BHO may get its own copy of the blob and send it to the attacker. The latter, in turn, sends the blob to the remote server. The remote server would receive two identical login data blobs and must reject the second one.

Let's assume that the blob from the attacker arrives first. The remote server sends the partial response requesting the out-of-band SAS. The attacker does not have the SAS easily, hence the remote server denies the login request. The blob from the user's browser arrives later; the remote server rejects this second login request having an identical data blob as before (used blob), as illustrated on FIG. 7. Once this behavior repeats, the user would probably guess that something is wrong. He should either remove malicious software from his computer or use another computer.

Let's now assume that the blob from the user's browser arrives first. The remote server requests the out-of-band SAS. After matching SAS and validating the blob, the server grants the login request to the user's browser. On the other hand, the blob from the attacker arrives later. The remote server rejects this second login request with the identical blob (See FIG. 8).

FIG. 9 illustrates the operations of an alternative embodiment of this invention for remote server login. When the user wants to login to the remote server using NIM, the web browser sends a request to the NIM web server. The NIM server responds with a login blob as described earlier. The browser redirects the blob to the remote server. The NIM server also establishes a secure and direct connection with the remote server, and sends SAS to the remote server. The remote server uses the received SAS to find the blob that contains the same SAS and makes sure they come from the same, network address. If such a matching is found, the remote server grants the login request from the browser who sent the blob and returns a post-login page to the browser. If a login data blob does not have a matching SAS sent from a NIM directly or the blob and the out-of-band SAS come from different source, the remote server rejects the login request.

A possible defeated attack against this alternative embodiment is as follow. Let's assume that there is a malicious BHO in the user's web browser. When NIM sends the login data blob to the browser, the BHO redirects the blob to the attacker. The latter sends the blob to the remote server. If the remote server had not adopted the out-of-band communication, it would grant the login request as illustrated in FIG. 3. With the invention, the remote server expects an out-of-band SAS sent directly from a NIM token. In this situation (FIG. 10), the blob and the SAS come from different network addresses. The remote server rejects the login request from the attacker. At the same time, the login request from the user's browser would have probably expired (timeout). The user would know something is wrong, especially if this behavior repeats. He should either remove malicious software from his computer or use another computer. As described earlier, it's hard for the attacker to use the login data blob to gain access to Remote Server.

Using the network address to ensure that the data blob and the SAS come from the same source is advantageous, because the attacker might forge the IP address. But it may cause some problems. With Network Address Translation (NAT) layers, firewalls, web proxies, anonymous proxies, and SSL/TLS, it is very difficult, if not impossible, for the attacker to find the final IP address of the payload that carries the login data blob. On the other hand, if the attacker is an insider, for example, in the same organization as the victim, the remote server might not be able to tell that the data blob and the SAS came from different source. If a user makes use of anonymous proxy services, the data blob and the SAS may end up with different IP addresses. In this case, the remote server could deny a legitimate user from login.

The invention claimed is:

1. A portable authentication token comprising
   a. connection means for connecting to a computer,
   b. browser communication means for communicating with a browser running on the computer,
   c. user authentication means for authenticating a user of the token to a server, wherein the user authentication means are triggered via the browser communication means when the user connects to the server from the browser of the computer, wherein the user authentication means are set to authenticate the user by communicating with the server through the browser, and
   out-of-band token communication means set to validate user authentication by establishing a communication channel between the token and the server, the communication channel bypassing the browser, wherein the user authentication means are set to send association data to the server through the browser, and wherein the out-of-band token communication means are set to send the same association data to the server.

2. The portable authentication token according to claim 1, wherein the browser communication means comprise a local agent and a host agent, wherein the local agent is set to be executed by the token while the host agent is set to be executed by the computer.

3. The portable authentication token according to claim 2, wherein the host agent comprises a web server.

4. The portable authentication token according to claim 2, wherein the communication channel comprises a connection between the local agent and the host agent, and a TCP/IP connection between the host agent and the server.

5. The portable authentication token according to claim 1, wherein the user authentication means or the out-of-band token communication means are set to encrypt at least part of the communications with the server in order that only the server can decrypt said part.

6. The portable authentication token according to claim 5, wherein the communications between the token and the server comprise using an IPSEC, or an SSL, or a TLS protocol.

7. The portable authentication token according to claim 1, wherein association data are generated by the token and comprise a random number.

8. The portable authentication token according to claim 1, wherein the user authentication means comprise at least one of the following user authentication techniques: regular password authentication, One Time Password authentication, Challenge Response authentication, PKI authentication.

9. The portable authentication token according to claim 1, wherein the user authentication means are set to send a data blob to the server through the browser, the data blob comprising
   a. user identification data,
   b. authentication data,
   c. a token identifier,
   d. anti-replay data against replay attacks, and
   e. association data.

10. The portable authentication token according to claim 9, wherein user identification data consist of a username, authentication data consist of a user password, and anti-replay data consist of a one time password or a counter or a timestamp.

11. The portable authentication token according to claim 9, wherein the data blob is signed by an asymmetric private key stored in the token or encrypted with an asymmetric public key of the server.

12. The portable authentication token according to claim 1, wherein the connection means comprise a USB connector.

13. The portable authentication token according to claim 1, wherein the token is or comprises a smart card.

14. A method for authenticating a user to a server, comprising the user connecting to the server from a browser running on a computer, the user being equipped with a portable authentication token, the token comprising
   a. connection means for connecting to the computer,
   b. browser communication means for communicating with the browser,
   c. user authentication means for authenticating the user of the token to the server,
   in response to the user connecting to the server, operating the user authentication means via the browser communication means wherein the user authentication means are set to authenticate the user by communicating with the server through the browser;
   validating the user authentication by establishing a communication channel between the token and the server, the communication channel bypassing the browser; and
   sending association data to the server through the browser, and sending the same association data to the server via the communication channel.

15. The method according to claim 14, wherein the browser communication means comprise a local agent and a host agent, the method further comprising executing the local agent by the token and executing the host agent by the computer.

16. The method according to claim 15, wherein the host agent comprises a web server.

17. The method according to claim 15, wherein the communication channel comprises a connection between the local agent and the host agent, and a TCP/IP connection between the host agent and the server.

18. The method according to claim 14, further comprising operating the token to encrypt at least part of the communications the token carries out with the server for the purpose of user authentication and of validation of the user authentication, in order that only the server can decrypt said part.

19. The method according to claim 18, wherein the communications between the token and the server comprise using an IPSEC, an SSL or a TLS protocol.

20. The method according to claim 14, comprising generating the association data by the token as a random number.

21. The method according to claim 14, triggering user authentication in response to the user, after connecting to the server, instructing the browser to authenticate the user with the token.

22. The method according to claim 14, triggering the user authentication automatically by the server, in response to the user connecting to the server.

23. The method according to claim 14, comprising establishing the communication channel automatically after the user authentication means have authenticated the user to the server.

24. The method according to claim 14, comprising establishing the communication channel upon instruction of the server, after the server has authenticated the user with the user authentication means of the token.

25. The method according to claim 24, comprising operating the server to instruct the token to establish the communication channel by sending a javascript code to the browser.

26. The method according to claim 14, wherein the user authentication means comprise at least one of the following user authentication techniques: regular password authentication, One Time Password authentication, Challenge Response authentication, PKI authentication.

27. The method according to claim 14, operating the user authentication means to send a data blob to the server through the browser, the data blob comprising
   a. user identification data,
   b. authentication data,
   c. a token identifier,
   d. anti-replay data against replay attacks, and
   e. association data.

28. The method according to claim 27, wherein user identification data consist of a username, authentication data consist of a user password, and anti-replay data consist of a one time password or a counter and/or or a timestamp.

29. The method according to claim 27, comprising signing the data blob using an asymmetric private key stored in the token or encrypting the data blob with an asymmetric public key of the server.

30. The method according to claim 14, wherein the connection means comprise a USB connector.

31. The method according to claim 14, wherein the token is or comprises a smart card.

32. A system comprising a portable authentication token, a server, and a computer running a browser, the token comprising
   a. connection means for connecting to the computer,
   b. browser communication means for communicating with the browser,
   c. user authentication means for authenticating a user of the token to the server,
   wherein the user authentication means are triggered via the browser communication means when the user connects to the server from the browser of the computer,
   wherein the user authentication means are set to authenticate the user by communicating with the server through the browser,
   out-of-band token communication means set to validate user authentication by establishing a communication channel between the token and the server, the communication channel bypassing the browser;
   wherein the user authentication means are set to send association data to the server through the browser, and wherein the out-of-band token communication means are set to send the same association data to the server.

* * * * *